(12) United States Patent
Asaeda et al.

(10) Patent No.: US 9,592,750 B2
(45) Date of Patent: Mar. 14, 2017

(54) CHILD SEAT LOCK DEVICE (71) Applicant: DELTA KOGYO CO., LTD., Hiroshima (JP)

(72) Inventors: Naonori Asaeda, Hiroshima (JP); Atsushi Onji, Hiroshima (JP)

(73) Assignee: DELTA KOGYO CO., LTD. (JP)

( * ) Notice: Subject to any disclaimer, the term of this patent is extended or adjusted under 35 U.S.C. 154(b) by 0 days.

(21) Appl. No.: 14/898,496

(22) PCT Filed: Feb. 3, 2015

(86) PCT No.: PCT/JP2015/052904
§ 371 (c)(1),
(2) Date: Dec. 15, 2015

(87) PCT Pub. No.: WO2015/122313
PCT Pub. Date: Aug. 20, 2015

(65) Prior Publication Data
US 2016/0144751 A1 May 26, 2016

(30) Foreign Application Priority Data

Feb. 17, 2014 (JP) ................................ 2014-027267

(51) Int. Cl.
*B60N 2/26* (2006.01)
*B60N 2/28* (2006.01)
(Continued)

(52) U.S. Cl.
CPC ............... *B60N 2/28* (2013.01); *B60N 2/289* (2013.01); *B60N 2/2893* (2013.01); *B60N 2/58* (2013.01); *B60N 2/70* (2013.01); *B60N 2/7017* (2013.01)

(58) Field of Classification Search
CPC ...... B60N 2/28; B60N 2/2887; B60N 2/2893; B60N 2/58; B60N 2/70
(Continued)

(56) References Cited

U.S. PATENT DOCUMENTS 5,941,601 A * 8/1999 Scott .................... B60N 2/2821
297/253 X
6,082,819 A * 7/2000 Jackson ............... B60N 2/2821
297/253 X
(Continued)

FOREIGN PATENT DOCUMENTS

CN 102712270 A 10/2012
DE 102015119724 A1 * 5/2016 ........... B60N 2/2887
(Continued)

OTHER PUBLICATIONS

Chinese Office Action Dated Oct. 17, 2016.

*Primary Examiner* — Rodney B White
(74) *Attorney, Agent, or Firm* — Gerald E. Hespos; Michael J. Porco; Matthew T. Hespos (57) ABSTRACT

A child seat lock device has an anchor that is secured to a vehicle body frame and retains a catch of a child seat in a removable manner. A seat cushion is attached to the vehicle body frame independently of the anchor. The seat cushion has a cushion pad that is provided with a groove that houses the catch retained by the anchor and extends in a front-rear direction of the seat. A skin is provided for covering the cushion pad and has, at a location in front of the groove, an insertion slit into which the catch is inserted. A guide is provided for guiding the inserted catch from the insertion slit toward the anchor at the position of the groove. The guide is harder than the cushion pad.

5 Claims, 5 Drawing Sheets (51) Int. Cl.
*B60N 2/58* (2006.01)
*B60N 2/70* (2006.01)

(58) Field of Classification Search
USPC .......................................................... 297/253
See application file for complete search history.

(56) References Cited

U.S. PATENT DOCUMENTS

| | | | | |
|---|---|---|---|---|
| 6,416,128 | B1* | 7/2002 | Fujii | B60N 2/2893 |
| | | | | 297/253 X |
| 6,419,199 | B1* | 7/2002 | Skofljanec | B60N 2/28 |
| | | | | 24/633 |
| 6,478,376 | B2* | 11/2002 | Hayashi | B60N 2/2821 |
| | | | | 297/253 X |
| 6,601,917 | B1* | 8/2003 | Christopherson | B60N 2/2821 |
| | | | | 297/253 X |
| 7,281,763 | B1* | 10/2007 | Hayashi | B60N 2/2893 |
| | | | | 297/253 |
| 8,328,280 | B2* | 12/2012 | Parker | B60N 2/2887 |
| | | | | 297/253 X |
| 8,371,651 | B2* | 2/2013 | Abe | B60N 2/2881 |
| | | | | 297/253 |
| 8,434,828 | B2* | 5/2013 | Arata | B60N 2/289 |
| | | | | 297/353 |
| 8,740,309 | B2* | 6/2014 | Kajihara | B60N 2/58 |
| | | | | 297/452.38 |
| 9,409,499 | B2* | 8/2016 | Funaki | B60N 2/28 |
| 2001/0013716 | A1 | 8/2001 | Hayashi et al. | |
| 2013/0015695 | A1 | 1/2013 | Kramm | |
| 2016/0200224 | A1* | 7/2016 | Fujikake | B60N 2/289 |
| | | | | 297/452.38 |

FOREIGN PATENT DOCUMENTS

| | | |
|---|---|---|
| JP | 2001-199268 | 7/2001 |
| JP | 2001-199271 | 7/2001 |
| JP | 2001-233104 | 8/2001 |
| JP | 2013-60124 | 4/2013 |

\* cited by examiner

CHILD SEAT LOCK DEVICE

TECHNICAL FIELD

The present invention relates to a child seat lock device.

BACKGROUND ART

Figure 5A:
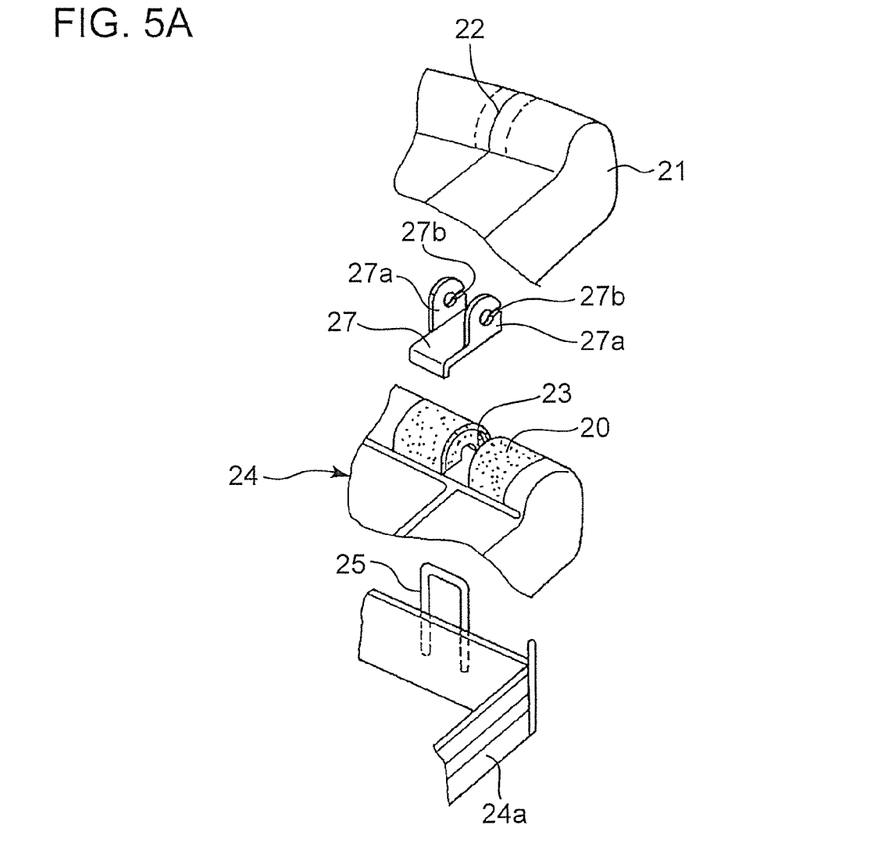
FIG. 5A is an exploded perspective view showing principal parts of a seat cushion of a conventional (Patent Literature 1) vehicle seat.
Figure 5B:
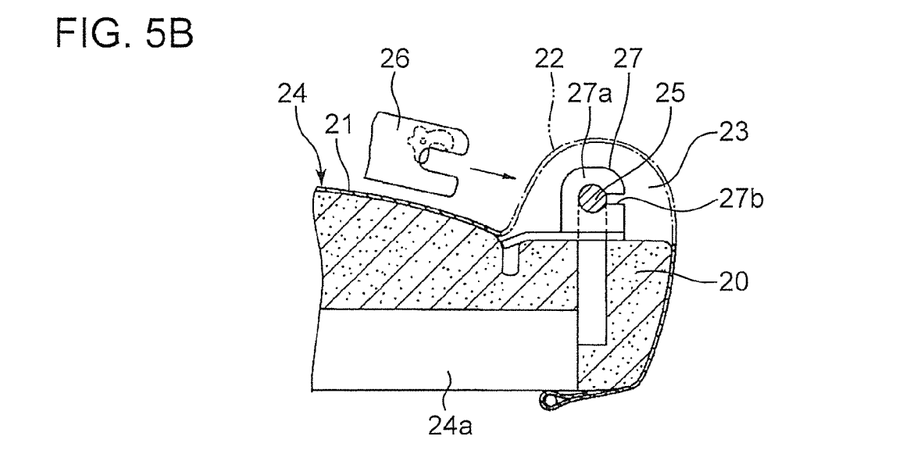
FIG. 5B is a cross-sectional diagram showing principal parts of the conventional vehicle seat.

A child seat lock device described in Japanese Unexamined Patent Publication No. 2001-233104 has conventionally been known. In this lock device, an insertion slit 22 is formed in a skin 21 that covers a cushion pad 20 of a seat cushion 24, as shown in FIGS. 5A and 5B. A depressed portion (groove portion) 23 is formed in a part of the cushion pad 20 that corresponds to the position of the slit 22. This lock device also has an anchor 25 that is secured to a seat frame 24a in such a manner as to face the depressed portion 23.

A catch 26 of the child seat is inserted into the depressed portion 23 of the cushion pad 20 through the slit 22 and locked to the anchor 25 in a removable manner.

The lock device is provided with a guide member 27, which is in roughly an opposite C shape, for guiding the catch 26 of the child seat from the slit 22 to the anchor 25. The guide member 27 is positioned within the depressed portion 23 by having cutouts 27b of both side portions 27a fitted into the anchor 25. This guidance by the guide member 27 prevents a tip end portion of the catch 26 from biting into the skin 21 around the slit 22. The guidance by the guide member 27 also prevents the tip end portion of the catch 26 from being shoved into and ruining the cushion pad 20 in the depressed portion 23.

For the purpose of enhancing the safety of the child seat, it is preferred that the lock device described above be designed to be able to secure the child seat more strongly. The complicated shape of the guide member 27 and the need to assemble the guide member 27 into the anchor 25 bring about a problem of increase in manufacturing cost and assembly cost of the lock device.

SUMMARY OF INVENTION

The present invention was contrived in order to solve the foregoing problem, and an object thereof is to provide a more inexpensive child seat lock device for ensuring higher level of safety and preventing trouble where a tip end portion of a catch of a child seat bites into a skin.

A child seat lock device according to the present invention is a child seat lock device for locking a child seat having a catch to a vehicle body having a vehicle body frame, the child seat lock device having an anchor that is secured to the vehicle body frame and retains the catch in a removable manner, and a seat cushion that is attached to the vehicle body frame independently of the anchor, wherein the seat cushion has a cushion pad that is provided with a groove portion that houses the catch retained by the anchor and extends in a front-rear direction of the seat, a skin for covering the cushion pad and having, at a location in front of the groove portion, an insertion slit into which the catch is inserted, and a guide portion for guiding the inserted catch from the insertion slit toward the anchor at the position of the groove portion, the guide portion being harder than the cushion pad.

DESCRIPTION OF EMBODIMENTS

Figure 1A:
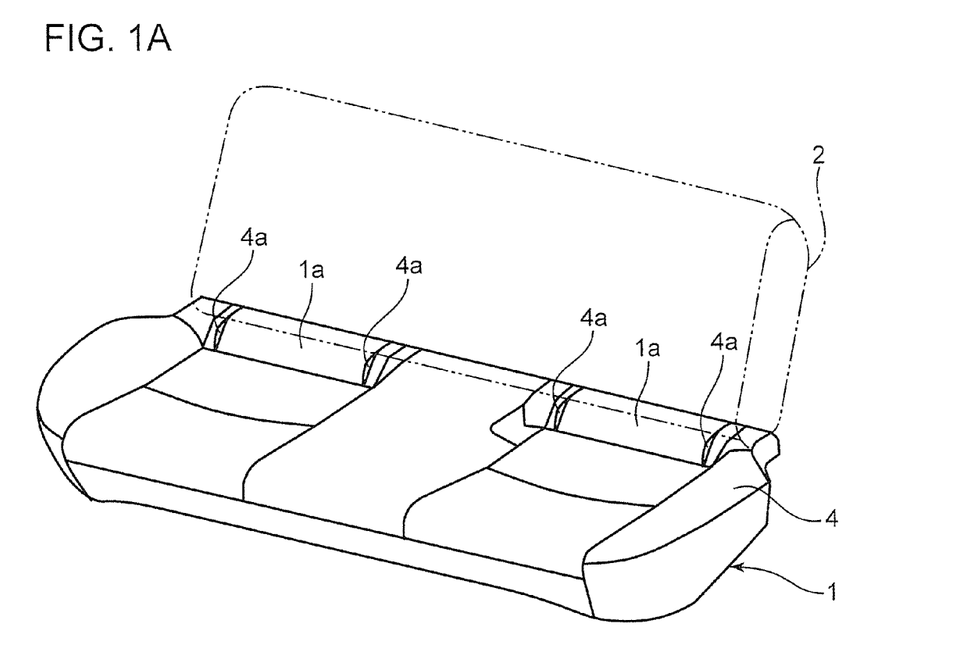
FIG. 1A is a perspective view showing a vehicle seat of a child seat lock device according to the present invention.
Figure 1B:
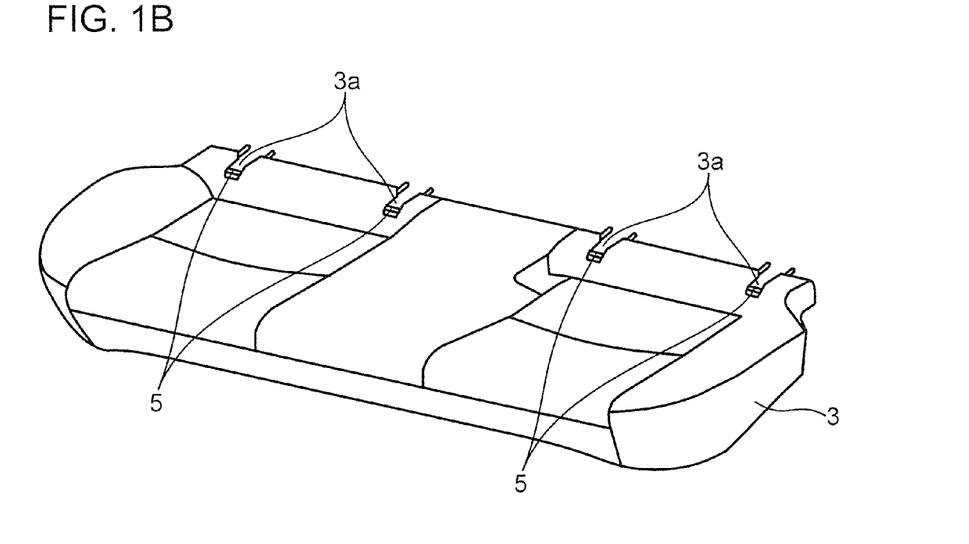
FIG. 1B is a perspective view showing a seat cushion without a skin.
Figure 2A:
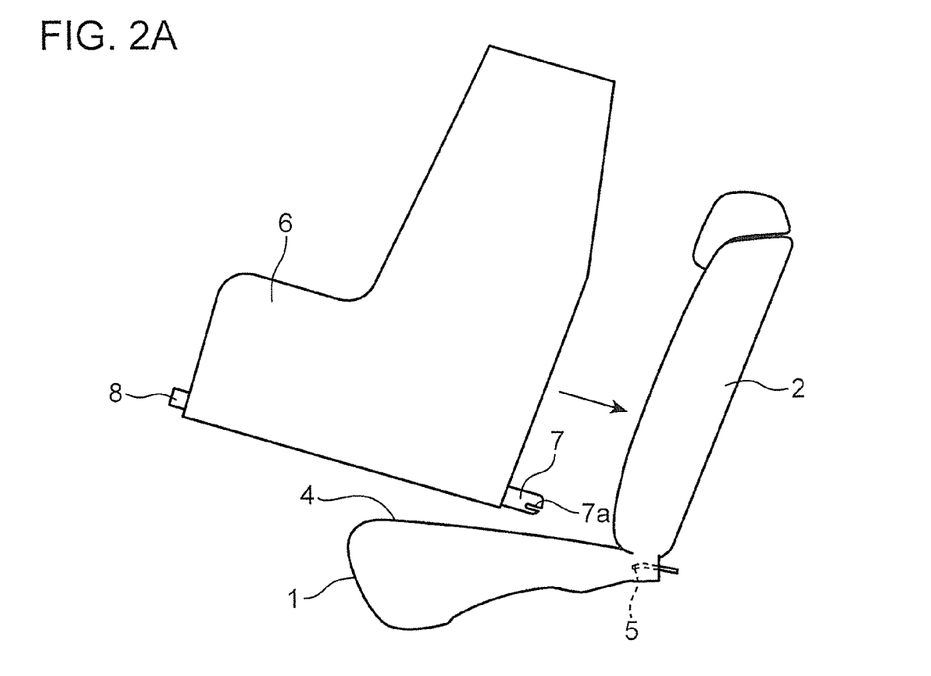
FIG. 2A is a side view showing a gist of how a child seat is locked to the vehicle seat.
Figure 2B:
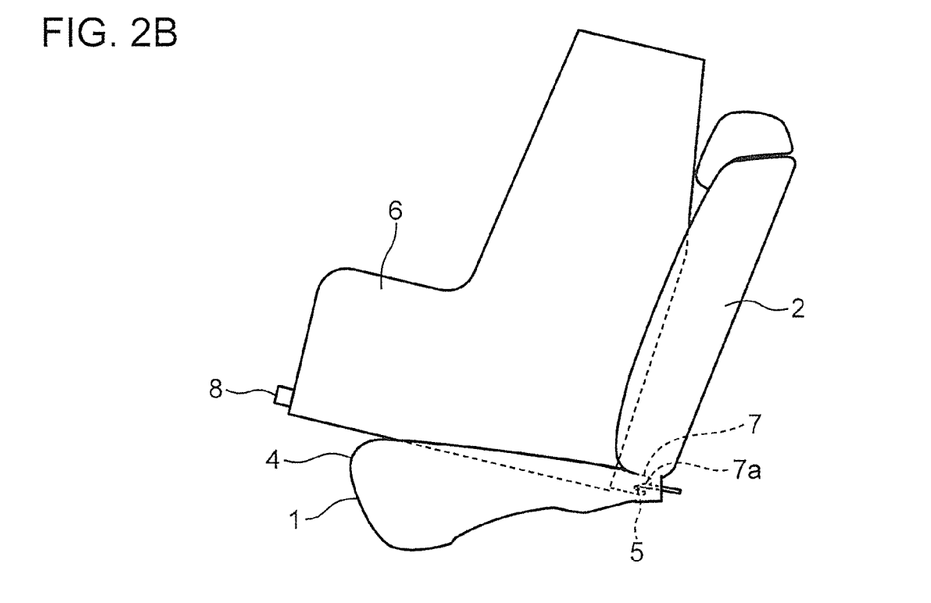
FIG. 2B is a side view showing a state in which the child seat is locked to the vehicle seat.

Embodiments of the present invention are now described hereinafter in detail with reference to the drawings. FIG. 1A is a perspective view showing a vehicle seat of a child seat lock device according to the present invention. FIG. 1B is a perspective view showing a seat cushion without a skin 4. FIG. 2A is a side view showing a gist of how a child seat is locked to the vehicle seat. FIG. 2B is a side view showing a state in which the child seat is locked to the vehicle seat.

The vehicle seat, which is a rear seat, for example, is configured by connecting a seat cushion 1 and a seat back 2 to each other. The seat cushion 1 and the seat back 2 each have a cushion pad 3 covering a seat frame (not shown) and its outer surface, and the skin (trim) 4 covering the cushion pad 3. The seat frame of the seat cushion 1 of the rear seat is secured to a vehicle body frame, not shown, and thereby incorporated in the vehicle.

Figure 3A:
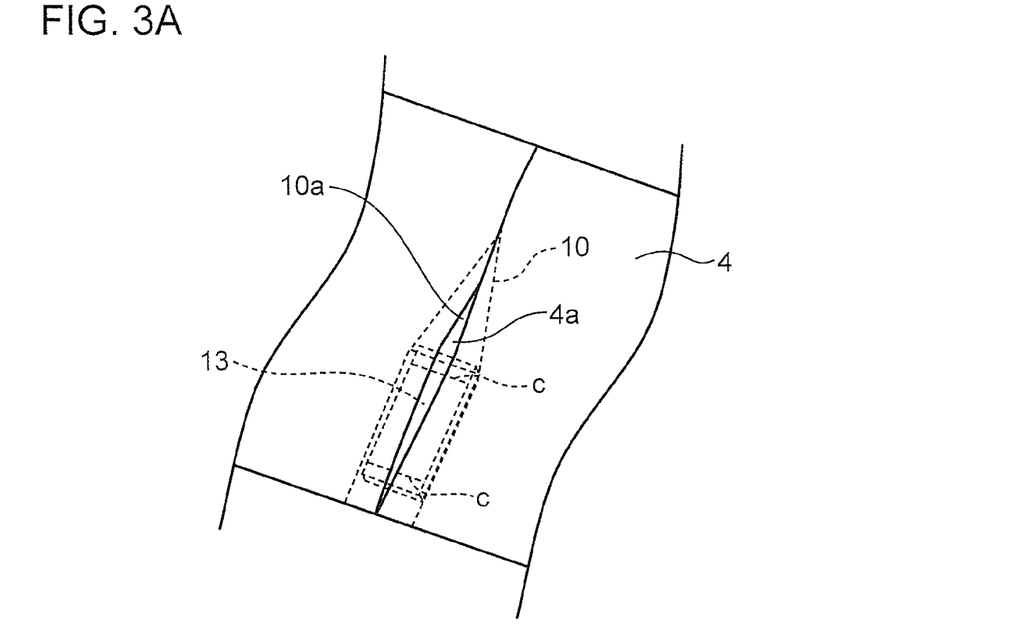
FIG. 3A is a perspective view showing the front side of a slit portion of a skin of the vehicle seat.

A rear end portion of the seat cushion 1 is shaped into an arc bulging upward. The skin 4 covering an arc surface at the front side of this bulging portion 1a has insertion slits 4a that extend vertically on both right and left sides of the seating position, as shown in FIG. 3A.

The cushion pad 3 has depressed portions 3a (groove portions) with bottom surfaces 3b, which extend in the front-rear direction and correspond to the positions of the slits 4a. Anchors 5 are disposed facing the upper sides of the bottom surfaces 3b of the depressed portions 3a. The anchors 5 are each configured by forming a metal rod material roughly into a U shape and secured to the vehicle frame. The anchors 5 and the rear seat (seat cushion 1) are secured to the vehicle frame independently of each other. Each of the bottom surfaces 3b may be tilted with its rear portion lifted.

Arm-shaped catches 7 that extend rearward from positions corresponding to the respective positions of the slits 4a are attached to a child seat 6. Cutouts 7a that can be fitted into the respective anchors 5 are formed at tip end portions of the catches 7.

Although not specifically shown, the tip end portion of each catch 7 is provided with a lock lever that is latched to the corresponding anchor 5 when the cutout 7a is fitted into the anchor 5. The lock levers are capable of latching/releasing the front portions of the child seat 6 by means of an operation lever 8.

In order to lock the child seat 6 to the anchors 5, the child seat 6 is placed on the seat cushion 1 and the catches 7 are inserted into the slits 4a while moving the child seat 6 toward the seat back 2, as shown in FIG. 2A. Consequently, the cutouts 7a of the catches 7 are fitted into the anchors 5, latching the lock levers to the anchors 5 and thereby locking the child seat 6 to the anchors 5.

In so doing, the cutouts 7a of the catches 7 of the child seat 6 are fitted into the anchors 5, while the tip end portions of the catches 7 are guided at the positions of the depressed portions 3a of the cushion pad 3. This configuration is described hereinafter in detail.

Figure 3B:
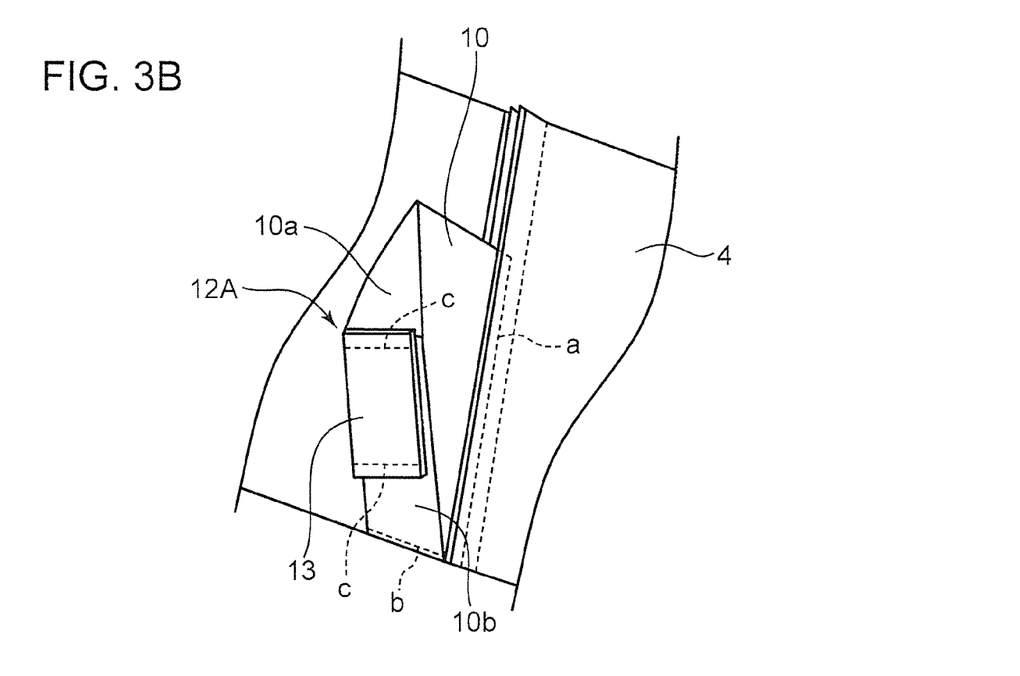
FIG. 3B is a perspective view showing the rear side of the slit portion of the skin.

Because parts provided inside the seat cushion 1 are visible from the slits 4a of the skin 4, the seat cushion 1 is provided with a blind member 10 for hiding the inside of each slit 4a as shown in FIGS. 3A and 3B.

The blind members 10 are each generally formed into a cylinder by, for example folding a flexible non-woven fabric that is approximately 1mm in thickness roughly into a U shape, and have edges thereof stitched to both respective edges of the slits 4a with sewing thread a and thereby attached to the skin 4 in such a manner as to face the inside of the depressed portion 3a.

Upper portions of the blind members 10 have openings 10a for fitting the cutouts 7a into the anchors 5, the cutouts 7a being formed at the tip end portions of the catches 7 inserted into the slits 4a. Lower portions of the blind members 10 are attached to lower edges of the slits 4a with sewing thread b. Bottom portions 10b of the blind members 10, that is, the sections below the openings 10a, are formed in contact with the bottom surfaces 3b of the depressed portions 3a of the cushion pad 3.

When the blind members 10 are left in this state, and when inserting the catches 7 into the slits 4a, the tip end portions of the catches 7 bite into the soft bottom surfaces 3b of the depressed portions 3a through the blind members 10, making it difficult to insert the catches 7.

In order to cope with such a situation, the bottom portions 10b of the blind members 10 are each provided with a guide plane portion 12A (same as the guide portion according to the present invention) that is harder than the cushion pad 3, to guide the catches 7 to the anchors 5.

Figure 4A:
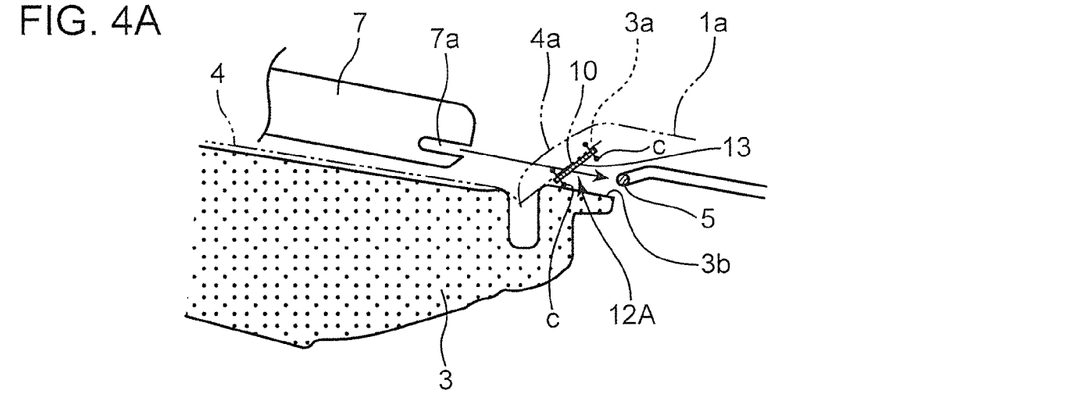
FIG. 4A is a cross-sectional diagram of a first embodiment of a guide plane portion.

The guide plane portion 12A shown in FIG. 4A (first embodiment) is configured by stitching, with sewing thread c, or adhering a rectangular hard plate 13 (same as the plate member according to the present invention) to a rear surface of the bottom portion 10b of the corresponding blind member 10. The guide plane portion 12A makes the bottom portion 10b of the blind member 10 a hard, flat rectangle. As shown in FIG. 4A, the hard plate 13 is lifted obliquely from the bottom surface 3b of the depressed portion 3a. However, once the catch 7 is inserted into the slit 4a and the tip end portion of the catch 7 comes into abutment with the blind member 10, the blind member 10 stretches out and reaches the bottom surface 3b of the depressed portion 3a, whereby the hard plate 13 is supported by the bottom surface 3b of the depressed portion 3a.

The hard plate 13 is preferably made of synthetic resin (e.g., a PP plate that is approximately 1mm in thickness) but may be made of metal (e.g., an aluminum plate). The hard plate 13 can be omitted by melting the bottom portion 10b of each blind member 10, for example, and then hardening the bottom portion 10b.

Figure 4B:
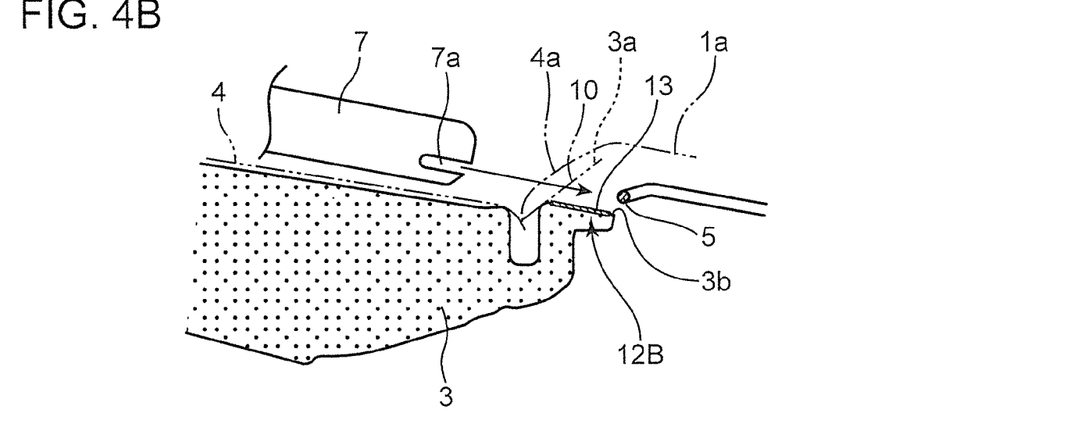
FIG. 4B is a cross-sectional diagram of a second embodiment of the guide plane portion.
Figure 4C:
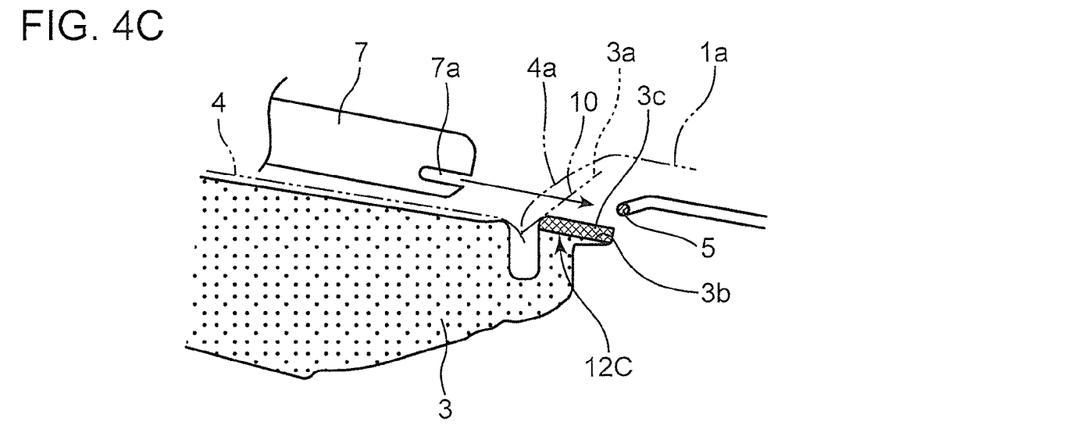
FIG. 4C is a cross-sectional diagram of a third embodiment of the guide plane portion.

The above has described an example in which the bottom portion 10b of each blind member 10 is provided with the guide plane portion 12A. However, instead of having the guide plane portion 12A on each bottom portion 10b, the following guide plane portions 12B, 12C (same as the guide portion according to the present invention) may be provided on the bottom surface 3b of each of the depressed portions 3a of the cushion pad 3.

The guide plane portion 12B shown in FIG. 4B (second embodiment) is configured by adhering a rectangular hard plate 13 made of synthetic resin (same as the plate member according to the present invention) to the bottom surface 3b of each depressed portion 3a with which the bottom portion 10b of the corresponding blind member 10 comes into contact. The guide plane portion 12B makes the bottom surface 3b of the depressed portion 3a a hard, flat rectangle.

The guide plane portion 12C shown in FIG. 4C (third embodiment) is formed from a surface portion 3c of the corresponding bottom surface 3b (see the cross-hatched part) by making the bottom surface 3b of each depressed portion 3a, with which the bottom portion of the corresponding blind member 10 comes into contact, harder than the other parts by means of different hardness molding or the like. The guide plane portion 12C makes the surface portion 3c of the bottom surface 3b of the depressed portion 3a a hard, flat rectangle.

According to the foregoing child seat lock device, the child seat 6 is locked to the anchors 5 that are secured directly to the vehicle body frame. Therefore, the child seat can be secured more strongly and stably, compared to the conventional device of this type that locks a child seat to a seat frame. Thus, a safer child seat lock device can be provided.

According to this child seat lock device, the guide plane portions 12A to 12C that are harder than the cushion pad 3 are provided to the bottom portions 10b of the blind members 10 attached to the skin 4 or the bottom surfaces 3b of the depressed portions 3a of the cushion pad 3 that are located immediately behind the bottom portions 10b of the blind members 10. Therefore, when locking the child seat 6 to the anchors 5, such a configuration can prevent the tip end portions of the catches 7 from biting into the blind members 10 or into the bottom surfaces 3b of the depressed portions 3a through the blind members 10, and facilitate easy insertion of the catches 7. Consequently, the catches 7 can be guided smoothly to the anchors 5 by the hard guide plane portions 12A to 12C along the bottom surfaces 3b.

Moreover, the simple shape of the hard guide plane portions 12A to 12C and the unnecessity to assemble them to the anchors 5 help reduce the manufacturing cost and assembly cost. Furthermore, because the lateral direction of the tip end portion of each catch 7 is guided at both sides of the corresponding blind member 10, the catches 7 can be guided more smoothly to the anchors 5.

According to the configuration in which the bottom portions 10b of the blind members 10 or the bottom surfaces 3b of the depressed portions 3a of the cushion pad 3 are provided with the guide plane portions 12A to 12C, the cushion pad 3 or skin 4 of the seat cushion 1 can be created with a simple process.

The guide plane portion 12A shown in FIG. 4A can be configured by simply stitching or adhering the flat hard plate 13 to the rear surface of the bottom portion 10b of the corresponding blind member 10, accomplishing a reduction in manufacturing cost and assembly cost. In addition, attaching the hard plate 13 to each blind member 10 can prevent positional displacement of the hard plate 13. Also, attaching the hard plate 13 to the rear surface of each blind member 10 can prevent the hard plate 13 from being seen through each slit 4a.

The guide plane portion 12B shown in FIG. 4B can be configured by simply adhering the flat hard plate 13 to the bottom surface 3b of each depressed portion 3a of the cushion pad 3 with which the bottom portion 10b of the corresponding blind member 10 comes into contact, accomplishing a reduction in manufacturing cost and assembly cost. In addition, attaching the hard plate 13 to the bottom surface 3b of each depressed portion 3a can prevent positional displacement of the hard plate 13. Also, attaching the hard plate 13 to the bottom surface 3b of each depressed portion 3a can prevent the hard plate 13 from being seen through each slit 4a.

The guide plane portion 12C shown in FIG. 4C can be obtained by simply forming the bottom surface 3b of each depressed portion 3a of the cushion pad 3, with which the bottom portion 10b of the corresponding blind member 10 comes into contact, as the hard surface portion 3c by means of different hardness molding or the like, accomplishing a reduction in manufacturing cost and assembly cost. In addition, forming the bottom surface 3b of each depressed portion 3a as the hard surface portion 3c can prevent positional displacement of the hard surface portion 3c. Also, forming the hard surface portion 3c as the bottom surface 3b of each depressed portion 3a can prevent the hard surface portion 3c from being seen through each slit 4a.

The present invention described above is summarized as follows.

A child seat lock device according to one aspect of the present invention is a child seat lock device for locking a child seat having a catch to a vehicle body having a vehicle body frame, the child seat lock device having an anchor that is secured to the vehicle body frame and retains the catch in a removable manner, and a seat cushion that is attached to the vehicle body frame independently of the anchor, wherein the seat cushion has a cushion pad that is provided with a groove portion that houses the catch retained by the anchor and extends in a front-rear direction of the seat, a skin for covering the cushion pad and having, at a location in front of the groove portion, an insertion slit into which the catch is inserted, and a guide portion for guiding the inserted catch from the insertion slit toward the anchor at the position of the groove portion, the guide portion being harder than the cushion pad.

According to the present invention, the child seat is locked to the anchor secured to the vehicle body frame. Therefore, the child seat can be secured more strongly and stably, enhancing the safety of the child seat.

The skin or cushion pad is provided with the guide portion that is harder than the cushion pad. Therefore, when locking the child seat to the anchor, the guide portion can prevent the tip end portion of the catch from biting into the skin or a bottom surface of the groove portion. Consequently, the catch can be guided smoothly to the anchor by the hard guide portion.

The simple shape of the hard guide portion and the unnecessity to assemble it to the anchor help reduce the manufacturing cost and assembly cost.

In the foregoing configuration, it is preferred that the skin include a blind member that hides the inside of the insertion slit in such a manner as to face the inside of the groove portion and is made of a flexible material, and that the guide portion be provided at a position, in the blind member, that faces the inside of the groove portion.

According to this configuration, the guide portion can be provided by taking advantage of the blind member for hiding the inside of the insertion slit. Furthermore, because the tip end portion of the catch is guided by the blind member when the catch is inserted into the insertion slit, the catch can be guided to the anchor more smoothly.

More specifically, the blind member has a bottom portion capable of coming into contact with a bottom surface of the groove portion, and the guide portion is formed from a plate member that is attached to a rear surface of the bottom portion of the blind member.

According to this configuration, the flat, hard plate member can simply be stitched or adhered to the rear surface of the bottom portion of the blind member, accomplishing a reduction in manufacturing cost and assembly cost. Moreover, attaching the plate member to the blind member can prevent positional displacement of the plate member. Also, attaching the plate member to the rear surface of the blind member can prevent the plate member from being seen through the slit.

Note that the guide portion may be formed from a plate member that is attached to the bottom surface of the groove portion.

According to this configuration, the flat, hard plate member can simply be adhered to the bottom surface of the groove portion, accomplishing a reduction in manufacturing cost and assembly cost. Moreover, attaching the hard plate member to the bottom surface of the groove portion can prevent positional displacement of the plate member. Attaching the plate member to the bottom surface of the groove portion can also prevent the plate member from being seen through the slit.

The guide portion may be a hard surface portion that is formed on the bottom surface of the groove portion.

According to this configuration, the bottom surface of the groove portion can simply be made hard by means of different hardness molding or the like, accomplishing a reduction in manufacturing cost and assembly cost. Moreover, forming the bottom surface of the groove portion as the hard surface portion can prevent positional displacement of the hard surface portion. Also, forming the hard surface portion as the bottom surface of the groove portion can prevent the hard surface portion from being seen through the slit.

The invention claimed is:

1. A child seat lock device for locking a child seat having a catch to a vehicle body having a vehicle body frame, the child seat lock device comprising:
   an anchor that is secured to the vehicle body frame and retains the catch in a removable manner; and
   a seat cushion that is attached to the vehicle body frame independently of the anchor,
   wherein
   the anchor is located within a rear portion of the seat cushion,
   the seat cushion has a cushion pad that is provided with a groove portion that houses the catch retained by the anchor and extends in a front-rear direction of the seat, a skin covering the cushion pad and having, at a location in front of the groove portion, a vertically extending insertion slit into which the catch is inserted, a blind member is provided independently of the skin and at the rear of the skin in a position corresponding to the insertion slit to hide the inside of the insertion slit in such a manner as to face the inside of the groove portion and is made of flexible material, and a guide portion for guiding the inserted catch from the insertion slit toward the anchor at the position of the groove portion, the guide portion being harder than the cushion pad, and the blind member is in a shape of a hollow cylinder extending in the front-rear direction of the seat and allows the catch guided from the insertion slit to pass through the inside of the blind member in such a manner that the catch is held by the anchor.

2. The child seat lock device according to claim 1, wherein the guide portion is provided at a position, in the blind member, that faces the inside of the groove portion.

3. The child seat lock device according to claim 2, wherein the blind member has a bottom portion capable of coming into contact with a bottom surface of the groove portion, and the guide portion is formed from a plate member that is attached to a rear surface of the bottom portion of the blind member.

4. The child seat lock device according to claim 1, wherein the guide portion is formed from a plate member that is attached to a bottom surface of the groove portion.

5. The child seat lock device according to claim 1, wherein the guide portion is a hard surface portion that is formed on a bottom surface of the groove portion.

\* \* \* \* \*